US012633135B2

(12) United States Patent  
Patnaik et al.

(10) Patent No.: US 12,633,135 B2  
(45) Date of Patent: May 19, 2026

(54) METHOD AND SYSTEM FOR TOPOLOGY DETECTION

(71) Applicant: EMBARK TRUCKS, INC., San Francisco, CA (US)

(72) Inventors: Anshuman Patnaik, San Francisco, CA (US); Gilbran D. Alvarez, Santa Maria, CA (US); Soheil Koushan, San Francisco, CA (US); Grady D. Williams, Oakland, CA (US)

(73) Assignee: EMBARK TRUCKS, INC., San Francisco, CA (US)

( * ) Notice: Subject to any disclaimer, the term of this patent is extended or adjusted under 35 U.S.C. 154(b) by 240 days.

(21) Appl. No.: 17/893,964

(22) Filed: Aug. 23, 2022

(65) Prior Publication Data

US 2024/0071101 A1    Feb. 29, 2024

(51) Int. Cl.  
*G06K 9/00* (2022.01)  
*B60W 40/06* (2012.01)  
*G06V 20/56* (2022.01)

(52) U.S. Cl.  
CPC ........... *G06V 20/588* (2022.01); *B60W 40/06* (2013.01); *B60W 2420/403* (2013.01)

(58) Field of Classification Search  
None  
See application file for complete search history.

(56) References Cited

U.S. PATENT DOCUMENTS

2020/0341466 A1* 10/2020 Pham ...................... G06V 20/56  
2022/0282990 A1* 9/2022 Reuveni ................... G08G 1/04

OTHER PUBLICATIONS

"PCT Notification of Transmittal of the International Search Report and the Written Opinion", International Searching Authority, mailed Oct. 2, 2023 (Oct. 2, 2023), for International Application No. PCT/US023/072724, 24pgs.

* cited by examiner

*Primary Examiner* — Wei Wen Yang  
(74) *Attorney, Agent, or Firm* — McDermott Will & Schulte LLP

(57) ABSTRACT

A system and method including receiving an image of a first lane of a road, the image being captured by a first sensor; defining the first lane as a set of N ordered points; representing the first lane by a combination of N ordered points and a predefined number of types of lane components, C; generating images, each image representing one of the types of lane components; and combining the generated images to generate a topology representation for the first lane.

17 Claims, 12 Drawing Sheets

800

805  
RECEIVE AN IMAGE OF A FIRST LANE OF A ROAD, THE IMAGE BEING CAPTURED BY A FIRST SENSOR OF THE VEHICLE

810  
DEFINE THE FIRST LANE AS A SET OF *N* ORDERED POINTS

815  
REPRESENT THE FIRST LANE, FOR EACH OF THE *N* ORDERED POINTS, BY A COMBINATION OF A PREDEFINED NUMBER OF TYPES OF LANE COMPONENTS, *C*

820  
GENERATE IMAGES, EACH IMAGE REPRESENTING ONE OF THE TYPES OF LANE COMPONENTS FOR ONE OF THE *N* ORDERED POINTS

825  
COMBINE THE GENERATED IMAGES TO GENERATE A TOPOLOGY REPRESENTATION FOR THE FIRST LANE

300

325

330

310

320

305

315

Traffic
Flow

400

405 415 425

410 420 430 435

Traffic
Flow

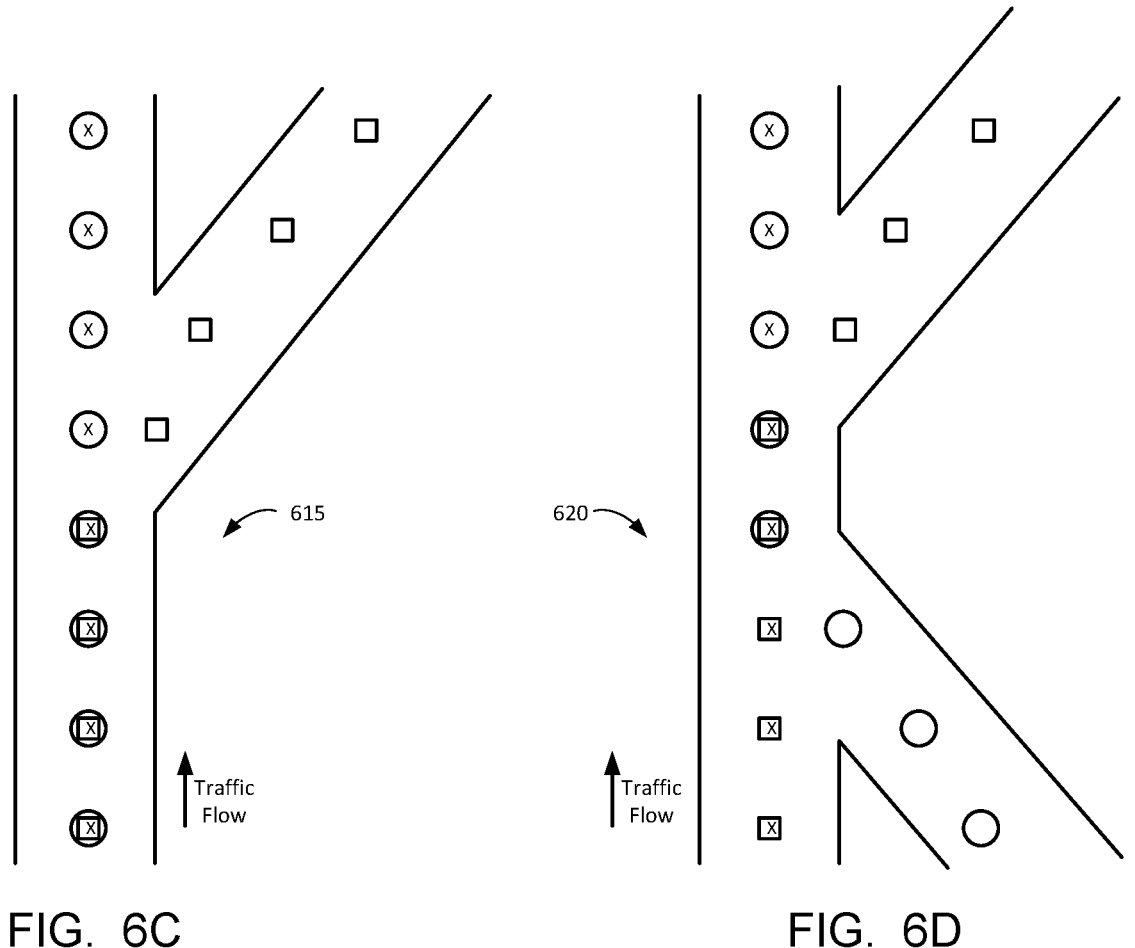
FIG. 6C                   FIG. 6D

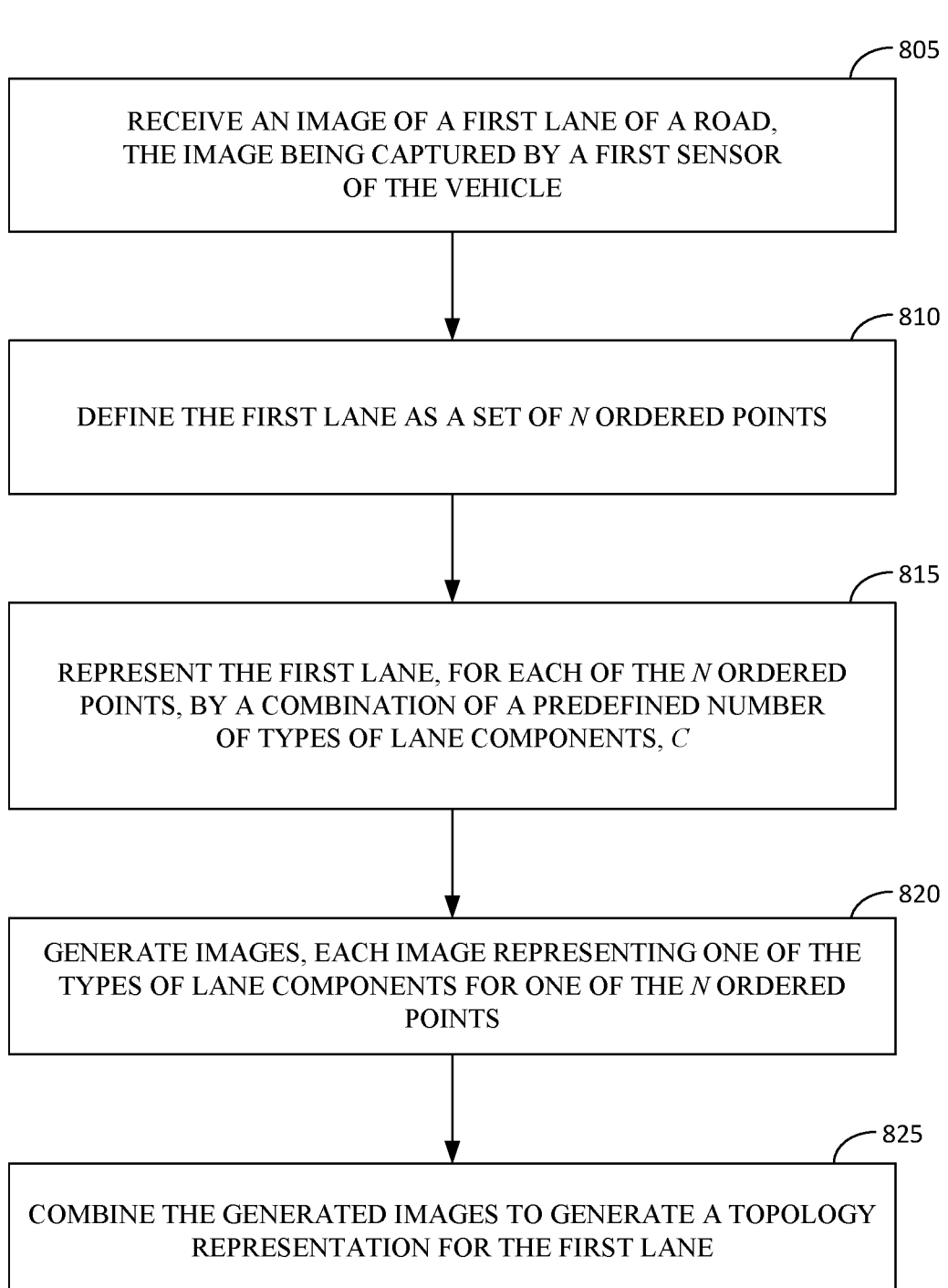

800

805

RECEIVE AN IMAGE OF A FIRST LANE OF A ROAD,
THE IMAGE BEING CAPTURED BY A FIRST SENSOR
OF THE VEHICLE

810

DEFINE THE FIRST LANE AS A SET OF $N$ ORDERED POINTS

815

REPRESENT THE FIRST LANE, FOR EACH OF THE $N$ ORDERED
POINTS, BY A COMBINATION OF A PREDEFINED NUMBER
OF TYPES OF LANE COMPONENTS, $C$

820

GENERATE IMAGES, EACH IMAGE REPRESENTING ONE OF THE
TYPES OF LANE COMPONENTS FOR ONE OF THE $N$ ORDERED
POINTS

825

COMBINE THE GENERATED IMAGES TO GENERATE A TOPOLOGY
REPRESENTATION FOR THE FIRST LANE

METHOD AND SYSTEM FOR TOPOLOGY DETECTION

BACKGROUND

Autonomous vehicles are motor vehicles capable of performing one or more necessary driving functions without a human driver's input, generally including Level 2 or higher capabilities as generally described in SAE International's J3016 Standard and including, in certain embodiments, self-driving trucks that include sensors, devices, and systems that may function together to generate sensor data indicative of various parameter values related to the position, speed, operating characteristics of the vehicle, and a state of the vehicle, including data generated in response to various objects, situations, and environments encountered by the autonomous vehicle during the operation thereof.

An autonomous vehicle may rely on sensors such as cameras, lidars, radars, inertial measurement units (IMUs), and the like to understand the road and the rest of the world around the vehicle without requiring user interaction. An accurate understanding and modelling of the road on which the autonomous vehicle operates is important so that, for example, the vehicle can safely navigate the road using the sensor readings (i.e., sensor data). Accurate modelling or estimation of the road can be critical for perception (computer vision), control, mapping, and other functions. Without a true understanding of the local environment in which it is operating, an autonomous vehicle might have trouble staying within its lane, as well as additional problems such as steering, navigation, and object avoidance.

As such, there exists a need for an efficient and robust system and method to accurately and efficiently determine or model road topology for the operation of an autonomous vehicle.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIGS. 6A-6D are illustrative examples of road lanes represented by a combination of lane components at N ordered points, in accordance with an example embodiment;

FIG. 8 is an illustrative flow diagram of a process, in accordance with an example embodiment.

Figure 1:
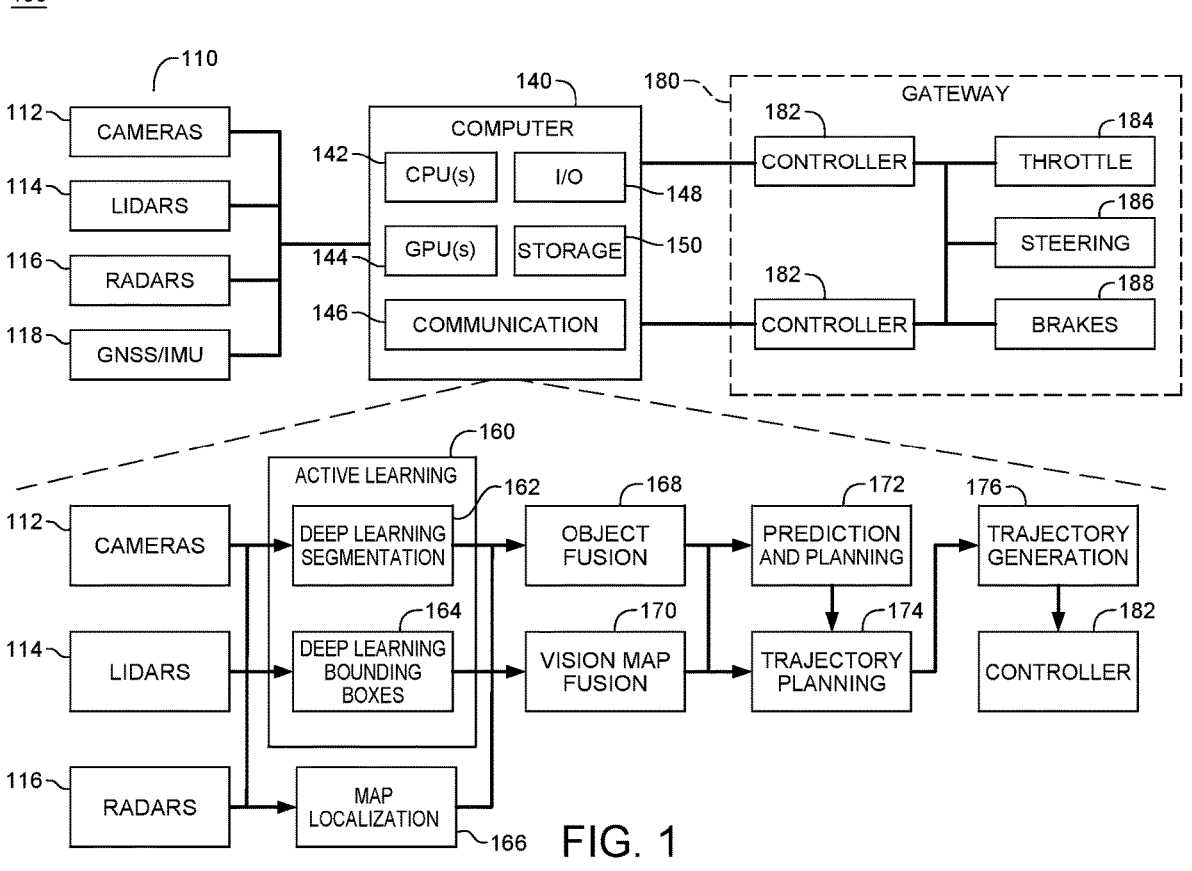
FIG. 1 is an illustrative block diagram of a control system that may be deployed in a vehicle, in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

For convenience and ease of exposition, a number of terms will be used herein. For example, the term "semi-truck" will be used to refer to a vehicle in which systems of the example embodiments may be used. The terms "semi-truck", "truck", "tractor", "vehicle" and "semi" may be used interchangeably herein. Further, as will become apparent to those skilled in the art upon reading the present disclosure, embodiments of the present invention may be used in conjunction with other types of vehicles. In general, embodiments may be used with desirable results in conjunction with any vehicle towing a trailer or carrying cargo over long distances.

Figure 2A:
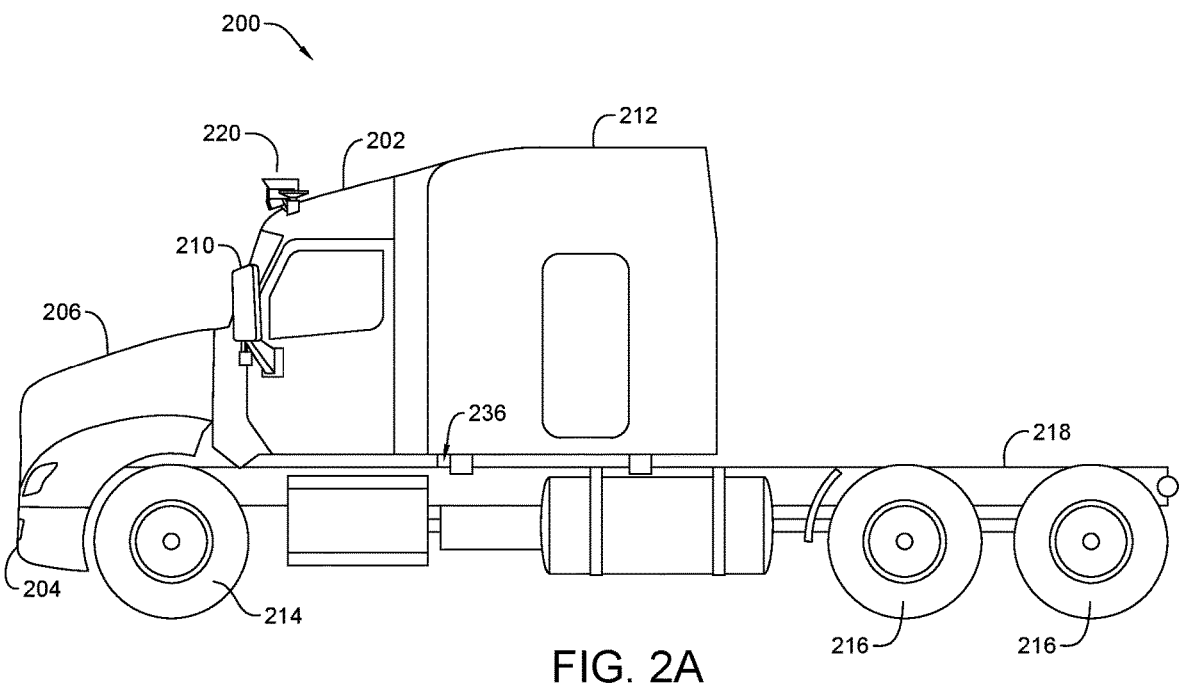
FIGS. 2A-2C are illustrative depictions of exterior views of a semi-truck, in accordance with example embodiments.
Figure 2B:
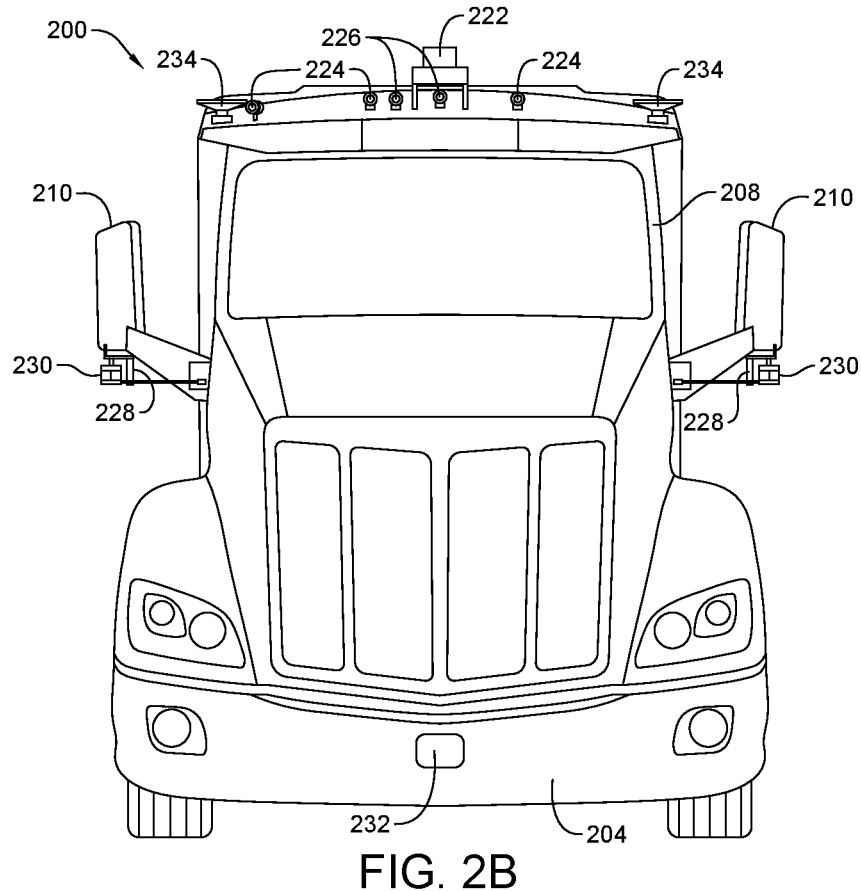
Figure 2C:
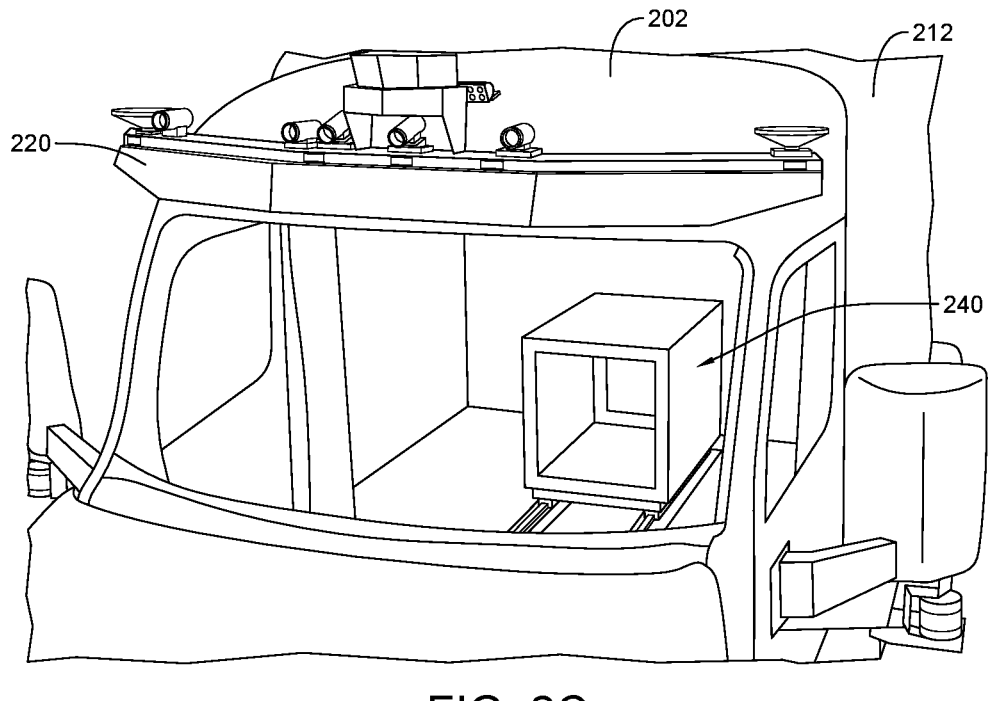

FIG. 1 illustrates a control system 100 that may be deployed in and comprise an autonomous vehicle (AV) such as, for example though not limited to, a semi-truck 200 depicted in FIGS. 2A-2C, in accordance with an example embodiment. Referring to FIG. 1, the control system 100 may include sensors 110 that collect data and information provided to a computer system 140 to perform operations including, for example, control operations that control components of the vehicle via a gateway 180. Pursuant to some embodiments, gateway 180 is configured to allow the computer system 140 to control different components from different manufacturers.

Computer system 140 may be configured with one or more central processing units (CPUs) 142 to perform processing, including processing to implement features of embodiments of the present invention as described elsewhere herein, as well as to receive sensor data from sensors 110 for use in generating control signals to control one or more actuators or other controllers associated with systems of the vehicle in which control system 100 is deployed (e.g., actuators or controllers allowing control of a throttle 184, steering systems 186, brakes 188 and/or other devices and systems). In general, control system 100 may be configured to operate the vehicle (e.g., semi-truck 200) in an autonomous (or semi-autonomous) mode of operation.

For example, control system 100 may be operated to capture images from one or more cameras 112 mounted at various locations of semi-truck 200 and perform processing (e.g., image processing) on those captured images to identify objects proximate to or in a path of the semi-truck 200. In some aspects, one or more lidars 114 and radar 116 sensors may be positioned on the vehicle to sense or detect the presence and volume of objects proximate to or in the path of the semi-truck 200. Other sensors may also be positioned or mounted at various locations of the semi-truck 200 to capture other information such as position data. For example, the sensors might include one or more satellite positioning sensors and/or inertial navigation systems such as GNSS/IMU 118. A Global Navigation Satellite System (GNSS) is a space-based system of satellites that provides the location information (longitude, latitude, altitude) and time information in all weather conditions, anywhere on or near the Earth to devices called GNSS receivers. GPS is the world's most used GNSS system and may be used interchangeably with GNSS herein. An inertial measurement unit ("IMU") is an inertial navigation system. In general, an inertial navigation system ("INS") measures and integrates orientation, position, velocities, and accelerations of a moving object. An INS integrates the measured data, where a GNSS is used as a correction to the integration error of the INS orientation calculation. Any number of different types of GNSS/IMU 118 sensors may be used in conjunction with features of the present invention.

The data collected by each of the sensors 110 may be processed by computer system 140 to generate control signals that might be used to control an operation of the semi-truck 200. For example, images and location information may be processed to identify or detect objects around or in the path of the semi-truck 200 and control signals may be transmitted to adjust throttle 184, steering 186, and/or brakes 188 via controller(s) 182, as needed to safely operate the semi-truck 200 in an autonomous or semi-autonomous manner. Note that while illustrative example sensors, actuators, and other vehicle systems and devices are shown in FIG. 1, those skilled in the art, upon reading the present disclosure, will appreciate that other sensors, actuators, and systems may also be included in system 100 consistent with the present disclosure. For example, in some embodiments, actuators that provide a mechanism to allow control of a transmission of a vehicle (e.g., semi-truck 200) may also be provided.

Control system 100 may include a computer system 140 (e.g., a computer server) that is configured to provide a computing environment in which one or more software, firmware, and control applications (e.g., items 160-182) may be executed to perform at least some of the processing described herein. In some embodiments, computer system 140 includes components that are deployed on a vehicle (e.g., deployed in a systems rack 240 positioned within a sleeper compartment 212 of the semi-truck as shown in FIG. 2C). Computer system 140 may be in communication with other computer systems (not shown) that might be local to and/or remote from the semi-truck 200 (e.g., computer system 140 might communicate with one or more remote terrestrial or cloud-based computer system via a wireless communication network connection).

According to various embodiments described herein, computer system 140 may be implemented as a server. In some embodiments, computer system 140 may be configured using any of a number of computing systems, environments, and/or configurations such as, but not limited to, personal computer systems, cloud platforms, server computer systems, thin clients, thick clients, hand-held or laptop devices, tablets, smart phones, databases, multiprocessor systems, microprocessor-based systems, set top boxes, programmable consumer electronics, network PCs, minicomputer systems, mainframe computer systems, distributed cloud computing environments, and the like, which may include any of the above systems or devices, and the like.

Different software applications or components might be executed by computer system 140 and control system 100. For example, as shown at active learning component 160, applications may be provided that perform active learning machine processing to process images captured by one or more cameras 112 and information obtained by lidars 114. For example, image data may be processed using deep learning segmentation models 162 to identify objects of interest in the captured images (e.g., other vehicles, construction signs, etc.). In some aspects herein, deep learning segmentation may be used to identify lane points within the lidar scan. As an example, the system may use an intensity-based voxel filter to identify lane points within the lidar scan. Lidar data may be processed by machine learning applications 164 to draw or identify bounding boxes on image data to identify objects of interest located by the lidar sensors.

Information output from the machine learning applications may be provided as inputs to object fusion 168 and vision map fusion 170 software components that may perform processing to predict the actions of other road users and to fuse local vehicle poses with global map geometry in real-time, enabling on-the-fly map corrections. The outputs from the machine learning applications may be supplemented with information from radars 116 and map localization 166 application data (as well as with positioning data). In some aspects, these applications allow control system 100 to be less map reliant and more capable of handling a constantly changing road environment. Further, by correcting any map errors on-the-fly, control system 100 may facilitate safer, more scalable and more efficient operations as compared to alternative map-centric approaches.

Information is provided to prediction and planning application 172 that provides input to trajectory planning 174 components allowing a trajectory to be generated by trajectory generation system 176 in real time based on interactions and predicted interactions between the semi-truck 200 and other relevant vehicles in the trucks operating environment. In some embodiments, for example, control system 100 generates a sixty second planning horizon, analyzing relevant actors and available trajectories. The plan that best fits multiple criteria (including safety, comfort and route preferences) may be selected and any relevant control inputs needed to implement the plan are provided to controller(s) 182 to control the movement of the semi-truck 200.

In some embodiments, these disclosed applications or components (as well as other components or flows described herein) may be implemented in hardware, in a computer program executed by a processor, in firmware, or in a combination of the above, unless otherwise specified. In some instances, a computer program may be embodied on a computer readable medium, such as a storage medium or storage device. For example, a computer program, code, or instructions may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of non-transitory storage medium known in the art.

A non-transitory storage medium may be coupled to a processor such that the processor may read information from, and write information to, the storage medium. In an alternative, the storage medium may be integral to the processor. The processor and the storage medium may reside in an application specific integrated circuit ("ASIC"). In an alternative embodiment, the processor and the storage medium may reside as discrete components. For example, FIG. 1 illustrates an example computer system 140 that may represent or be integrated in any of the components disclosed hereinbelow, etc. As such, FIG. 1 is not intended to suggest any limitation as to the scope of use or functionality of embodiments of a system and method disclosed herein. Computer system 140 is capable of being implemented and/or performing any of the functionality disclosed herein.

Computer system 140 may be described in the general context of computer system-executable instructions, such as program modules, being executed by a computer system. Generally, program modules may include routines, programs, objects, components, logic, data structures, and so on that perform particular tasks or implement particular abstract data types. Computer system 140 may be implemented in distributed cloud computing environments where tasks are performed by remote processing devices that are linked through a communications network. In a distributed cloud computing environment, program modules may be located in both local and remote computer system storage media including non-transitory memory storage devices.

Referring to FIG. 1, computer system 140 is shown in the form of a general-purpose computing device. The components of the computer system 140 may include, but are not limited to, one or more processors (e.g., CPUs 142 and GPUs 144), a communication interface 146, one or more input/output interfaces 148, and one or more storage devices 150. Although not shown, computer system 140 may also include a system bus that couples various system components, including system memory, to CPUs 142. In some embodiments, input/output (I/O) interfaces 148 may also include a network interface. For example, in some embodiments, some or all of the components of the control system 100 may be in communication via a controller area network ("CAN") bus or the like interconnecting the various components inside of the vehicle in which control system 100 is deployed and associated with.

In some embodiments, storage device 150 may include a variety of types and forms of non-transitory computer readable media. Such media may be any available media that is accessible by computer system/server, and it may include both volatile and non-volatile media, removable and non-removable media. System memory, in one embodiment, implements the processes represented by the flow diagram (s) of the other figures herein. The system memory can include computer system readable media in the form of volatile memory, such as random access memory (RAM) and/or cache memory. As another example, storage device 150 can read and write to a non-removable, non-volatile magnetic media (not shown and typically called a "hard drive"). Although not shown, the storage device 150 may include one or more removable non-volatile disk drives such as magnetic, tape or optical disk drives. In such instances, each can be connected to the bus by one or more data media interfaces. Storage device 150 may include at least one program product having a set (e.g., at least one) of program modules, code, and/or instructions that are configured to carry out the functions of various embodiments of the application.

FIGS. 2A-2C are illustrative depictions of exterior views of a semi-truck 200 that may be associated with or used in accordance with example embodiments. Semi-truck 200 is shown for illustrative purposes only. As such, those skilled in the art, upon reading the present disclosure, will appreciate that embodiments may be used in conjunction with a number of different types of vehicles and are not limited to a vehicle of the type illustrated in FIGS. 2A-2C. The example semi-truck 200 shown in FIGS. 2A-2C is one style of truck configuration that is common in North American that includes an engine 206 forward of a cab 202, a steering axle 214, and two drive axles 216. A trailer (not shown) may typically be attached to semi-truck 200 via a fifth-wheel trailer coupling that is provided on a frame 218 and positioned over drive axles 216. A sleeper compartment 212 may be positioned behind cab 202, as shown in 2A and 2C. FIGS. 2A-2C further illustrate a number of sensors that are positioned at different locations of semi-truck 200. For example, one or more sensors may be mounted on a roof of cab 202 on a sensor rack 220. Sensors may also be mounted on side mirrors 210, as well as other locations of the semi-truck. Sensors may be mounted on a bumper 204, as well as on the side of the cab 202 and other locations. For example, a rear facing radar 236 is shown as being mounted on a side of the cab 202 in FIG. 2A. Embodiments may be used with other configurations of trucks and other vehicles (e.g., such as semi-trucks having a cab over or cab forward configuration or the like). In general, and without limiting embodiments of the present disclosure, features of the present invention may be used with desirable results in vehicles that carry cargo over long distances, such as long-haul semi-truck routes.

FIG. 2B is a front view of the semi-truck 200 and illustrates a number of sensors and sensor locations. The sensor rack 220 may secure and position several sensors above windshield 208 including a long range lidar 222, long range cameras 224, GPS antennas 234, and mid-range front facing cameras 226. Side mirrors 210 may provide mounting locations for rear-facing cameras 228 and mid-range lidar 230. A front radar 232 may be mounted on bumper 204. Other sensors (including those shown and some not shown) may be mounted or installed on other locations of semi-truck 200. As such, the locations and mounts depicted in FIGS. 2A-2C are for illustrative purposes only.

Referring now to FIG. 2C, a partial view of semi-truck 200 is shown that depicts some aspects of an interior of cab 202 and the sleeper compartment 212. In some embodiments, portion(s) of control system 100 of FIG. 1 might be deployed in a systems rack 240 in the sleeper compartment 212, allowing easy access to components of the control system 100 for maintenance and operation.

Particular aspects of the present disclosure relate to a method and system providing a framework or architecture for generating an accurate representation of the topology of a road including one or more lanes, in real-time as an autonomous vehicle, AV, (e.g., a truck similar to that disclosed in FIGS. 1 and 2A-2C) is being operated (e.g., driven). Aspects of the present disclosure provide, in general, a framework to determine the topology of the lanes of a road in the vicinity of the AV accurately and efficiently, including, for example, different lane configurations.

As used herein, the topology of a road refers to a map of the structure or configuration of the road, wherein some embodiments of the present disclosure may be interested in the topology of the road in front of a subject AV (i.e., the ego vehicle).

Figure 3:
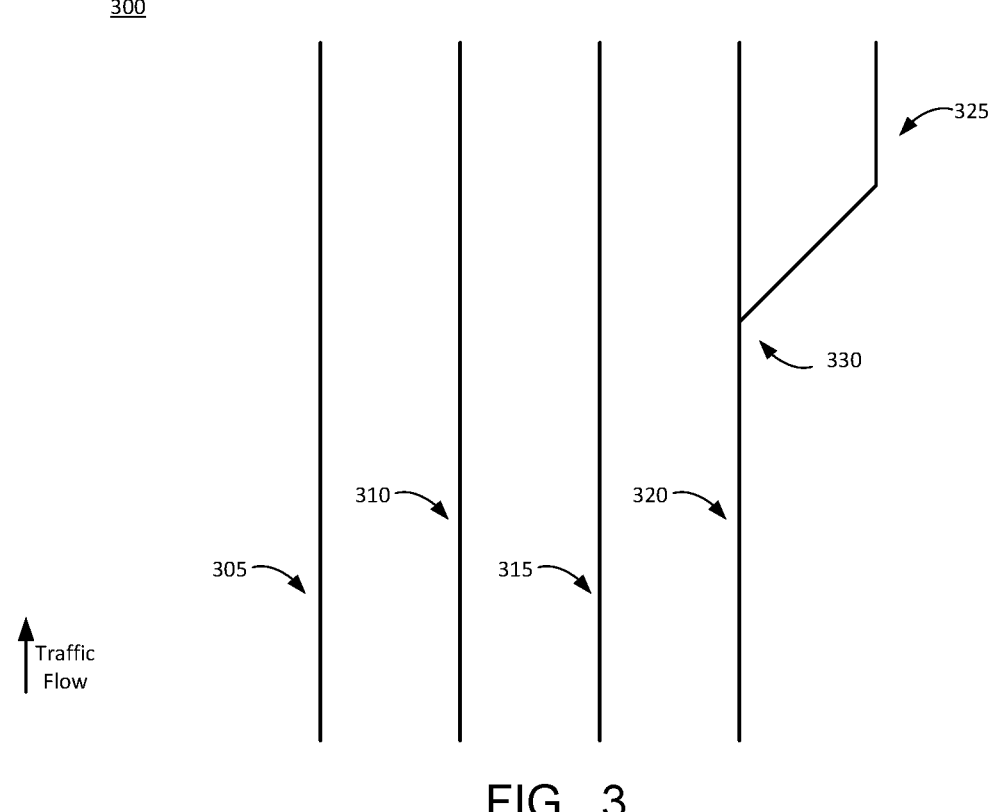
FIG. 3 is an illustrative depiction of a road including a plurality of lanes in which an autonomous vehicle may operate, in accordance with an example embodiment.

FIG. 3 is an illustrative depiction of a road including a plurality of lanes in which an AV (or other) vehicle may operate, in accordance with an example embodiment. FIG. 3 illustrates a road 300 including multiple lanes to accommodate vehicular traffic. In the example of FIG. 3, five (5) lanes of traffic are depicted, including lanes 305, 310, 315, 320, and 325, with the direction of traffic flow as indicated therein. In FIG. 3, as well as some other drawings herein, a road may be represented as a single line, where the single line representation may correspond to a center line of a traffic lane (i.e., the average between boundaries of a traffic lane). In some instances herein, a traffic lane may also be referred to simply as a lane. Lanes of a road may have different configurations. For example, road 300 includes lanes of differing configurations, where lanes 305, 310 and 315 may each be characterized as straight lanes and lane 320 may be characterized as a splitting lane since it splits or divides at 330 (e.g., an exit or off-ramp) into another lane 325.

Figure 4:
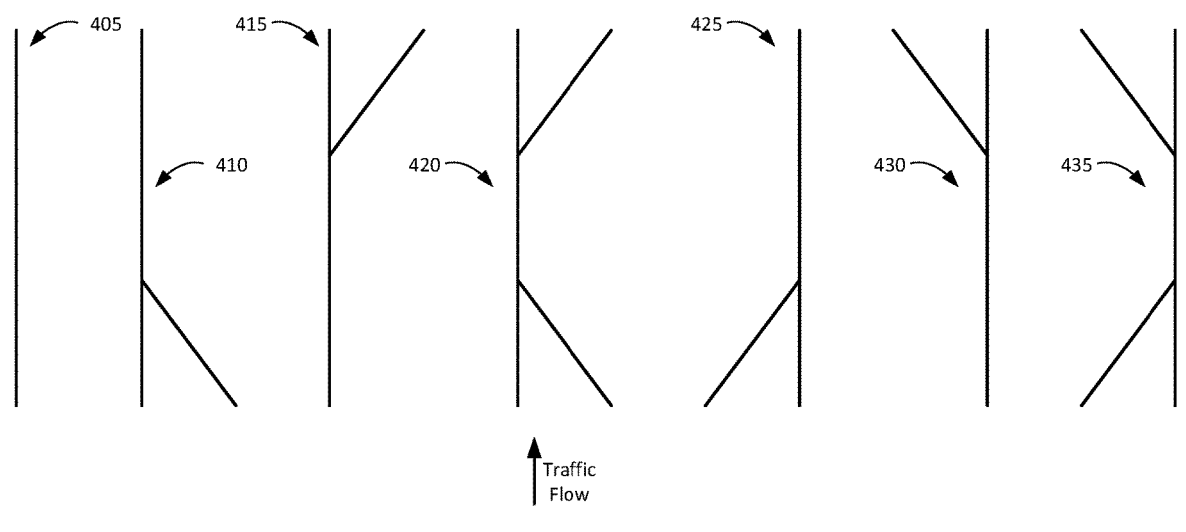
FIG. 4 is an illustrative depiction of a set of defined lane line geometries, in accordance with an example embodiment.

In some aspects, as demonstrated in part by the example lanes in FIG. 3, a lane may be characterized as having a particular lane line geometry (i.e., structural shape or configuration). In some embodiments herein, the lane line geometries for road lanes may be represented by a finite set of predefined, distinct shapes. FIG. 4 is an illustrative line drawing depiction of a set of predefined lane line geometries 400 that may be used to represent various different lane configurations, in some embodiments herein. The example set of predefined lane line geometries 400 includes seven (7) different lane line geometries. With reference to the traffic flow direction indicated in FIG. 4, the seven (7) lane line geometries of set 400 include a straight lane line geometry 405, a merging left lane line geometry 410, a splitting right lane line geometry 415, a merging left then splitting right lane line geometry 420, a merging right lane line geometry 425, a splitting left lane line geometry 430, and a merging right then splitting left lane line geometry 435.

In some embodiments, the set of predefined lane line geometries 400 may be used to describe or otherwise represent, alone or in combination(s), substantially all road configurations that might realistically be used or otherwise encountered by an AV. That is, real-world lane configurations may be fully represented by the set of predefined lane line geometries 400 in some operating contexts and use cases for an AV herein.

In accordance with some embodiments of the present disclosure, each lane line geometry (i.e., shape or configuration) of the set of predefined lane line geometries 400 may be characterized or defined by a combination of a predefined number, C, of types of lane components. In one example embodiment, the set of predefined lane line geometries 400 may be fully defined by a combination of three (i.e., C=3) predefined types of lane components. In this embodiment, the three (3) types of lane components might include a continuing lane component, a merging lane component, and a splitting lane component. In some aspects, the set of predefined lane line geometries 400 may be completely defined by the superposition (i.e., combining) of the three (3) types of lane components (i.e., the continuing lane component, the merging lane component, and the splitting lane component). Accordingly, the combining of the three (3) types of lane components disclosed herein may be used to characterize or define a road lane for substantially all road topologies, since substantially all road topologies can be represented by the set of predefined lane line geometries 400.

In some aspects, the disclosed framework including a set of predefined lane line geometries and a predefined number of lane component types that may be combined to define a road lane might be deployed on an AV to enable computing system(s) on the AV to characterize the lane(s) of interest in the vicinity of the AV in real-time as it travels on a road. In the instance the road includes more than one lane and the multiple lanes are of interest to the AV, the concepts and processes herein for determining a topology for a single lane may be applied to each lane of the multi-lane road and an aggregate of the multiple topologies, one for each lane, may be determined to generate a total or overall topology for the multi-lane road (e.g., FIG. 3, road 300).

In some embodiments, a system and process herein may leverage aspects of deep learning to detect the geometry of a road lane. In particular, aspects and techniques of landmark detection by neural networks may be used in some embodiments herein to detect the geometry of a road herein in a flexible, adaptable manner. For example, an image captured by an onboard camera of an AV as the vehicle traverses a road may be provided as an input to a neural network configured to characterize or define the lane(s) of the road as a set of N ordered points (i.e., keypoints/landmarks).

Figures 5A, 5B, 5C:
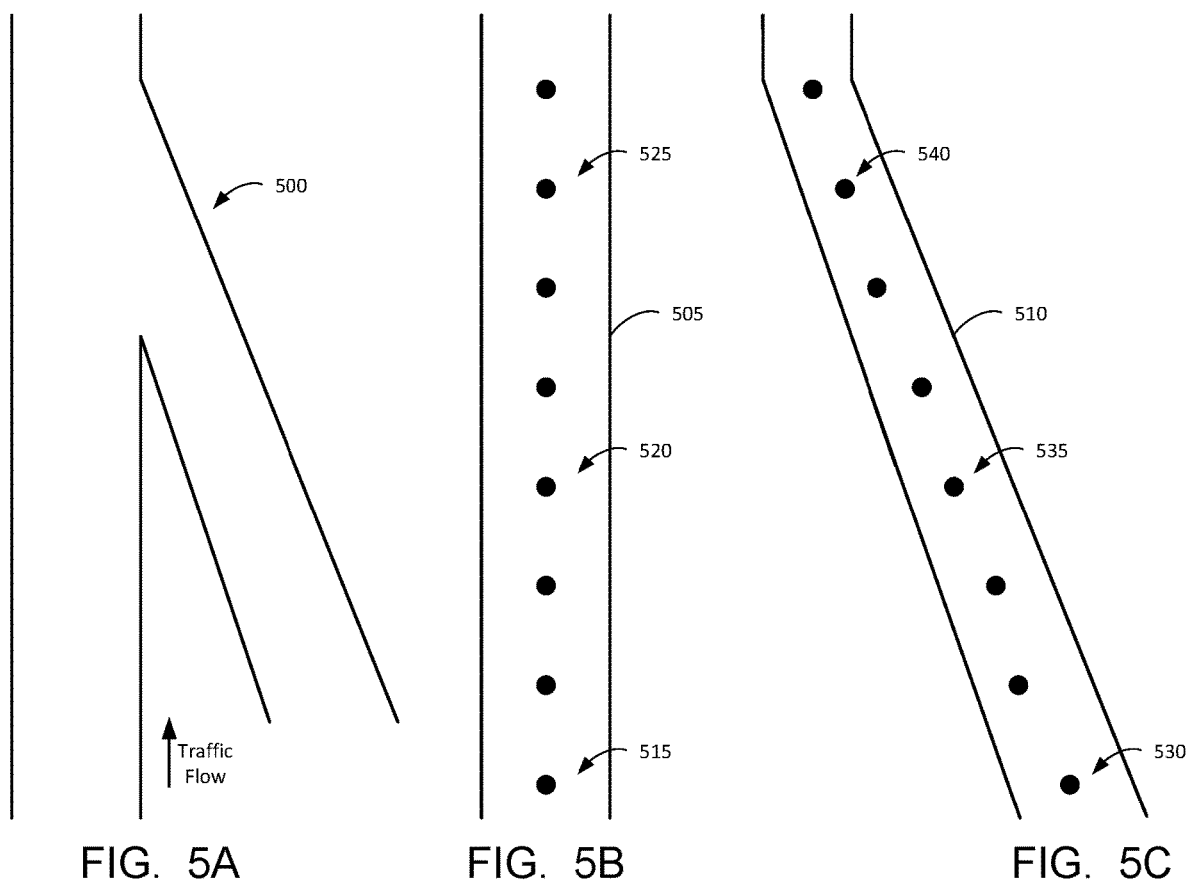
FIGS. 5A-5C are illustrative depictions of road lanes, including each lane being represented by N ordered points, in accordance with an example embodiment.

FIG. 5A is an illustrative depiction of a road 500, as captured, for example, in an image acquired by a camera on an AV as the vehicle traveled on the road. In the example of FIG. 5, the road comprises two (2) lanes, lane 505 (i.e., a continuing lane component) and lane 510 (i.e., a merging lane component). In accordance with other aspects herein, the road may be configured to include a splitting lane component, where the road might include one or more of the three (3) types of lane components disclosed herein in various combinations. Applying landmark detection process (es) to the image of road 500 may result in lanes 505 and 510 each being defined by a set of N ordered points (i.e., keypoints or landmarks) as depicted in FIGS. 5B and 5C, respectively. In the illustrated examples of FIGS. 5B and 5C, N=8 keypoints or landmarks, as demonstrated by representative keypoints or landmarks 515, 520, and 525 in FIG. 5B and representative keypoints or landmarks 530, 535, and 540 in FIG. 5B, where each of the keypoints or landmarks approximately correspond to the same position in each lane (e.g., 515-530; 520-535; and 525-540). In some embodiments, the value for N may be set based on, for example, a rule, an algorithm, operating state of an AV and the surroundings (environment) thereof, an implementation constraint (e.g., available computing resources, etc.), and other factors.

In some embodiments, each set of N ordered points (i.e., landmarks) is distributed vertically in the image. Also, each landmark may represent each of the three (or other number of defined) types of lane components disclosed herein (e.g., the continuing lane component, the merging lane component, and the splitting lane component). That is, each of the three (3) types of lane components will have N points describing it, such that a single lane herein may be defined by Nx C points (C=3).

Figures 6A, 6B:
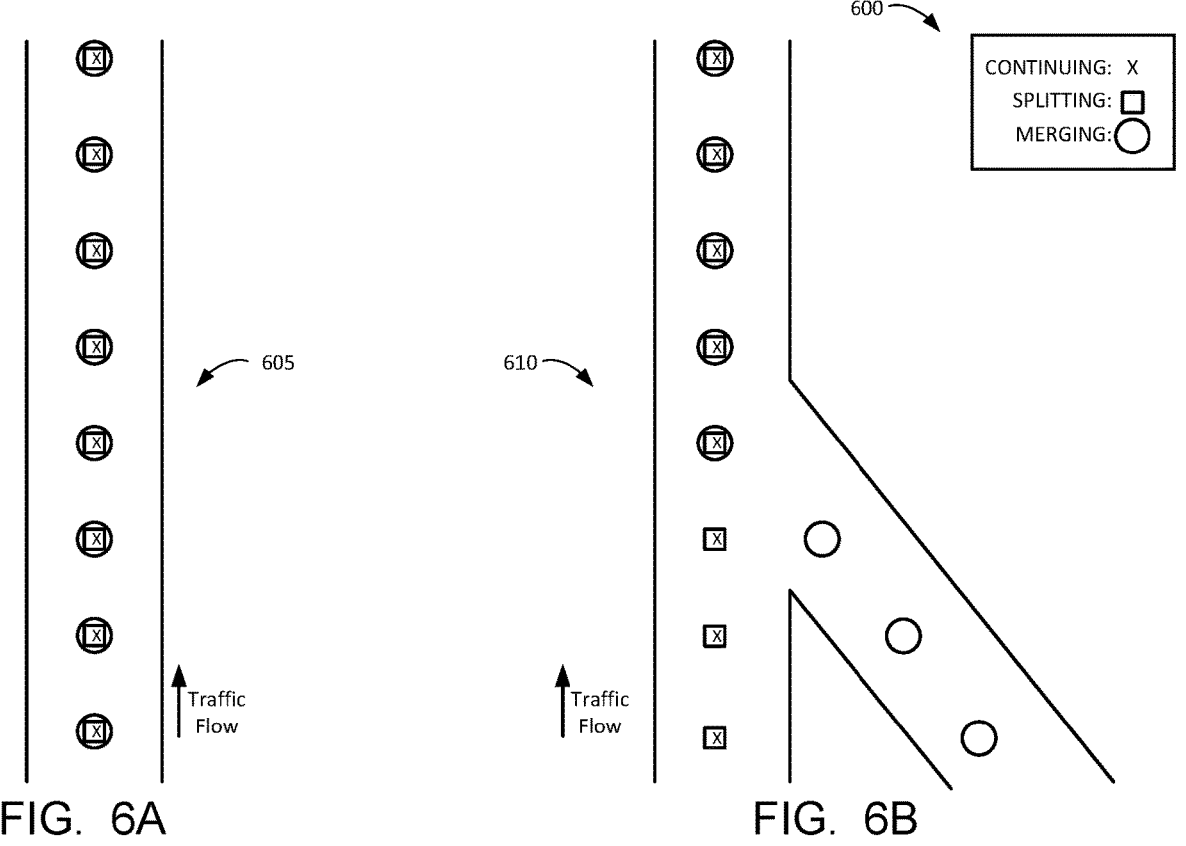

FIGS. 6A-6D are illustrative examples of road lanes represented by a combination of the three lane component types at N ordered points defining the lanes, in accordance with an example embodiment. FIG. 6A demonstrates the three lane component types at each of the landmarks for lane 605 having no splits or merges. The key 600 defines the graphic element representation for each of the three lane component types in FIGS. 6A-6D. For the strictly straight topology of road 605, all of the landmarks are collocated on top of each other. FIG. 6B shows a road 610 having the topology of a merging lane, where the location of the three lane component types at each of the landmarks is depicted. FIG. 6C demonstrates a road 615 having the topology of a splitting lane, where the location of the three lane component types at each of the landmarks is shown. FIG. 6D further illustrates a road 620 having the topology of a merging lane then a splitting lane, wherein this topology is also efficiently and fully represented by the location of the three lane component types disclosed herein at each of the determined landmarks.

In this manner, FIGS. 6A-6D demonstrate how aspects disclosed herein may effectively and flexibly represent the topology of a variety of different road lane configurations in an efficient manner. For example, in some regards, the topology of a lane may be represented or defined by a minimal number of parameters, Nx C.

Figure 7:
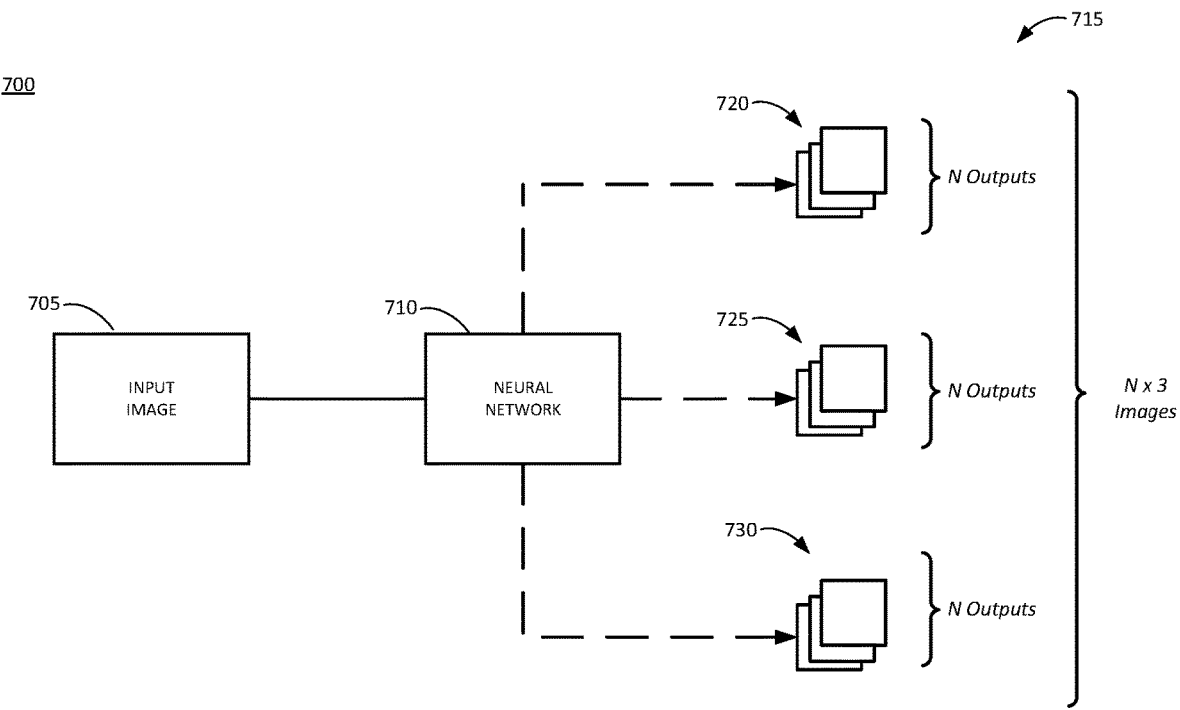
FIG. 7 is an illustrative block diagram of a system, in accordance with an example embodiment.

FIG. 7 is an illustrative block diagram of a system, in accordance with an example embodiment. In some aspects, FIG. 7 is a high level system architecture 700 for determining the topology for a single lane of a road. As illustrated, an input image 705 from a camera onboard an AV is received or otherwise obtained. The image may typically include a forward-looking perspective of the road in the immediate vicinity of the AV.

Input image 705 is provided to or otherwise received by, for example, a U-Net style (i.e., convolutional neural network) image segmentation network 710. In some embodiments, deep learning features are leveraged in the present disclosure to (1) interpret "objects as points" to detect keypoints or landmarks of a lane within the input image and (2) use neural network(s) to generate the desired output 715 including NxC (e.g., C=3) images, where the output images may be used to define a topology (i.e., structure) of the lane detected within the input image 705. In some respects, the desired output including NxC (e.g., C=3) images is a consequence of the problem representation (i.e., the manner in which a lane herein may be represented or defined by C (e.g., 3) types of lane components and N ordered landmarks) used in some embodiments herein.

In some embodiments neural network 710 might include implementations of U-Net style with ResNet-50 backbone convolutional neural network to generate the desired output images. However, embodiments of the present disclosure are not limited to using U-Net and ResNet-50 conventional networks and other deep learning techniques and processes, so long as compatible with other aspects herein, might be used. In some aspects, each output image contains one single keypoint or landmark, as described above. That is, every output image in the output 715 corresponds to one single keypoint or landmark. Given the desired output is N ordered points, the order of the images in the output 715 in FIG. 7 corresponds to the order of the keypoints or landmarks established or determined for a lane in the input image. Accordingly, the output 715 includes three different output type images (i.e., the continuing lane component images 720, the merging lane component images 725, and the splitting lane component images 730) for each keypoint that describes the merging lane, describes the continuing lane, and describes the splitting lane, respectively.

Recalling the principle of superposition of lane components introduced above, images for the keypoints may be used to determine the continuing lane component location, the merging lane component location, and the splitting lane component location for each keypoint or landmark, which may then be combined to generate or determine the topology for a given lane.

In some embodiments, the system and methodology disclosed herein for determining the topology for a single lane in an image may be extended to determine the topology of additional (i.e., other) lanes in the image. That is, the disclosed methods herein of representing lanes as specific lane component types and the leveraging and application of deep learning image segmentation and landmark detection techniques and neural networks may be applied to all of the lanes in an image to generate the overall or complete topology for a road including one or more lanes.

FIG. 8 is an illustrative flow diagram of an example of a road topology detection process 800, in accordance with an example embodiment. In some embodiments, a framework or architecture (e.g., FIG. 7, architecture 700) disclosed herein might be used to implement some aspects of process 800. In some instances, certain aspects of process 800 are discussed in detail elsewhere in the present disclosure and might not be repeated here in the following discussion of FIG. 8.

At operation 805, an image including a first lane of a road is received by a system, device, or apparatus implementing process 800. Process 800 might be executed by an AV as the vehicle travels on a road, wherein the image is captured or otherwise acquired by one or more camaras located onboard the AV and the image is received by a computer processing unit, device, system, component, or module on the vehicle for analysis and processing, in accordance with some example embodiments herein. In some aspects, as disclosed hereinabove, each lane of the road may be represented by a set of predefined lane line geometries At operation 810, the first lane in the image received at operation 805 may be defined by a set of N ordered (key)points. As disclosed hereinabove (e.g., FIG. 7), deep learning techniques, including certain types of neural networks, may be used to detect a set of N ordered keypoints or landmarks in the first lane in the image, where those N ordered keypoints define the first lane.

Continuing to operation 815, each of the N ordered points defining the first lane may be represented by a combination of a predefined number of types of lane components, C. As disclosed in some example embodiments herein, the predefined number (C) of types of lane components may be three (3), including a continuing lane component, a merging lane component, and a splitting lane component. In some aspects, as mentioned above, each lane line geometry in the set of predefined lane line geometries may be fully defined by a combination of the predefined number of types of lane components, C. Referring to the example of FIG. 4, the set of predefined lane line geometries might include seven (7) lane line geometries that may be defined by a combination of three predefined number of types of lane components, as further illustrated in FIGS. 6A-6D.

At operation 820, the aspects of defining the first lane as a set of N ordered points and representing the first lane by a combination of the predefined number of types of lane components C may be used to generate (NxC) images, where each image represents one of the types of lane components for one of the N ordered points. Aspects of this operation are demonstrated, for example, by the outputs 715 disclosed in FIG. 7.

Proceeding to operation 825, the images generated at operation 820 may be used to generate a topology representation for the first lane. In some aspects, the images generated at operation 820 may be combined (e.g., via superposition) to generate a topology representation for the first lane.

In some instances, process 800 might be executed for each lane in a multi-lane road to generate a complete topology representation for the road including all of the road's lanes. For example, process 800 might be performed for a first lane of the road and repeatedly (e.g., iteratively) executed, subsequently or at least in part parallel to the processing of the first lane, for each of the one or more additional lanes of the road generate a complete topology representation for the road including the first lane and the one or more additional lanes.

Figure 9:
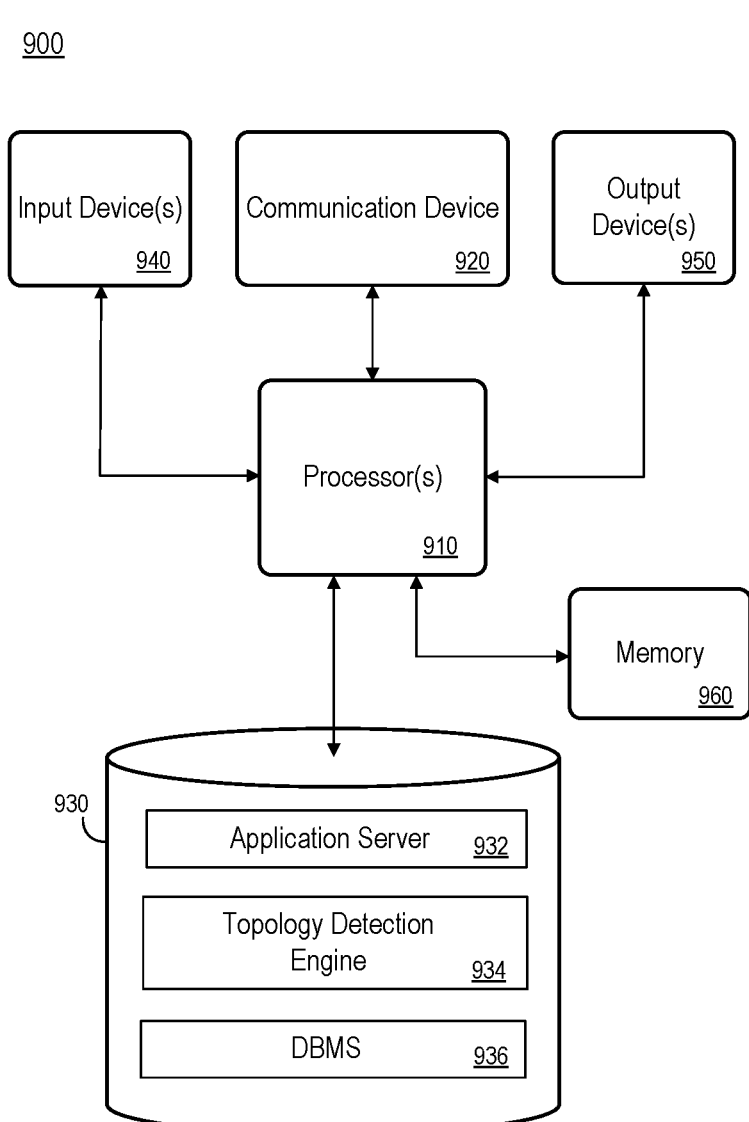
FIG. 9 is an illustrative block diagram of a computing system, in accordance with an example embodiment.

FIG. 9 illustrates a computing system 900 that may be used in any of the architectures or frameworks (e.g., FIG. 1, computer 140; FIG. 7, architecture 700) and processes (e.g., FIG. 8) disclosed herein, in accordance with an example embodiment. FIG. 9 is a block diagram of server node 900 embodying an event processor, according to some embodiments. Computing system 900 may comprise a general-purpose computing apparatus and may execute program code to perform any of the functions described herein. Computing system 900 may include other unshown elements according to some embodiments.

Computing system 900 includes processing unit(s) 910 operatively coupled to communication device 920, data storage device 930, one or more input devices 940, one or more output devices 950, and memory 960. Communication device 920 may facilitate communication with external devices, such as an external network, a data storage device, or other data source. Input device(s) 940 may comprise, for example, a keyboard, a keypad, a mouse or other pointing device, a microphone, knob or a switch, an infra-red (IR) port, a docking station, and/or a touch screen. Input device(s) 940 may be used, for example, to enter information into computing system 900 (e.g., a manual request for a specific tuning of AV operation or function). Output device(s) 950 may comprise, for example, a display (e.g., a display screen) a speaker, and/or a printer.

Data storage device 930 may comprise any appropriate persistent storage device, including combinations of magnetic storage devices (e.g., magnetic tape, hard disk drives and flash memory), optical storage devices, Read Only Memory (ROM) devices, etc., while memory 960 may comprise Random Access Memory (RAM).

Application server 932 may each comprise program code executed by processor(s) 910 to cause computing system 900 to perform any one or more of the processes described herein. Embodiments are not limited to execution of these processes by a single computing device. Data storage device 930 may also store data and other program code for providing additional functionality and/or which are necessary for operation of computing system 900, such as device drivers, operating system files, etc. Topology detection engine 934 may include program code executed by processor(s) 910 to generate a topology representation of one or more lanes of a road traversed by an AV, as disclosed in various embodiments herein. Topology detection engine 934 may refer to database management system, DBMS, 936 to retrieve images of the road being navigated to determine the topology of the lane(s) of the road, as disclosed herein. Results generated by the topology detection engine 934 may be stored in the DBMS node 936.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A vehicle computing system, comprising:
a memory storing computer instructions;
a data storage device storing data associated with operation of a vehicle including data captured by at least a first sensor; and
a processor communicatively coupled with the memory to execute the instructions and, during operation of the vehicle, capable of:
receiving an image of a first lane of a road, the image being captured by the first sensor;
defining the first lane as a set of N ordered points, wherein N is defined based on at least one of a current operating state of the vehicle, a current environment surrounding the vehicle, or any combination thereof;
representing the first lane, for each of the N ordered points, as an ordered sequence of a plurality of predefined lane components, the plurality of predefined lane components comprising a continuing lane component, a merging lane component, and a splitting lane component, each predefined lane component corresponding to a different structural portion of the first lane such that the ordered sequence of the plurality of predefined lane components in combination define a geometry of the first lane;
generating images based on the representation of the first lane, where each image represents one of the predefined lane components for one of the N ordered points; and combining the generated images to generate a topology representation for the first lane.

2. The vehicle computing system of claim 1, wherein each lane of the road is represented by a set of predefined lane line geometries defined by the ordered sequence of the plurality of predefined lane components.

3. The vehicle computing system of claim 2, wherein each lane line geometry in the set of predefined lane line geometries is fully defined by an ordered combination of the predefined lane components.

4. The vehicle computing system of claim 3, where the set of predefined lane line geometries includes a plurality of lane line geometries defined by a combination of C of the predefined lane components, where C is equal to at least 3 lane components and (N×C) images are generated based on associating one or more of the lane components with one or more of the N ordered points, wherein at least one of the plurality of lane line geometries is a merging lane component followed by a splitting lane component within the ordered sequence.

5. The vehicle computing system of claim 1, wherein the first sensor is a camera onboard the vehicle.

6. The vehicle computing system of claim 1, wherein the processor is further capable of:

receiving an image of a second lane of the road, the image of the second lane being captured by the first sensor;

defining the second lane as a set of N ordered points;

representing the second lane, for each of the N ordered points, as a second ordered sequence of a second plurality of predefined lane components, the second plurality of predefined lane components comprising the continuing lane component, the merging lane component, and the splitting lane component, such that the second ordered sequence of the second plurality of predefined lane components in combination define a geometry of the second lane;

generating images based on the representation of the first second lane, where each image represents one of the predefined lane components for one of the N ordered points for the second lane;

combining the generated images for the second lane to generate a topology representation for the second lane; and combining the generated topology representation for the second lane and the generated topology representation for the first lane to generate a complete topology representation for the road including the first lane and the second lane.

7. A method comprising:

receiving an image of a first lane of a road, the image being captured by a first sensor of a vehicle;

defining the first lane as a set of N ordered points, wherein N is defined based on at least one of a current operating state of the vehicle, a current environment surrounding the vehicle, or any combination thereof;

representing the first lane, for each of the N ordered points, as an ordered sequence of a plurality of predefined lane components, the plurality of predefined lane components comprising a continuing lane component, a merging lane component, and a splitting lane component, each predefined lane component corresponding to a different structural portion of the first lane such that the ordered sequence of the plurality of predefined lane components in combination define a geometry of the first lane;

generating images based on the representation of the first lane, where each image represents predefined lane components for one of the N ordered points; and combining the generated images to generate a topology representation for the first lane.

8. The method of claim 7, wherein each lane of the road is represented by a set of predefined lane line geometries defined by the ordered sequence of the plurality of predefined lane components.

9. The method of claim 8, wherein each lane line geometry in the set of predefined lane line geometries is fully defined by an ordered combination of the predefined lane components.

10. The method of claim 9, where the set of predefined lane line geometries includes a plurality of lane line geometries defined by a combination of C of the predefined lane components, where C is equal to at least 3 lane components and (N×C) images are generated based on associating one or more of the lane components with one or more of the N ordered points, wherein at least one of the plurality of lane line geometries is a merging lane component followed by a splitting lane component within the ordered sequence.

11. The method of claim 7, wherein the first sensor is a camera onboard the vehicle.

12. The method of claim 7, further comprising:

receiving an image of a second lane of the road, the image of the second lane being captured by the first sensor;

defining the second lane as a set of N ordered points;

representing the second lane, for each of the N ordered points, as a second ordered sequence of a second plurality of predefined lane components, the second plurality of predefined lane components comprising the continuing lane component, the merging lane component, and the splitting lane component, such that the second ordered sequence of the second plurality of predefined lane components in combination define a geometry of the second lane;

generating images based on the representation of the second lane, where each image represents one of the predefined lane components for one of the N ordered points for the second lane;

combining the generated images for the second lane to generate a topology representation for the second lane; and combining the generated topology representation for the second lane and the generated topology representation for the first lane to generate a complete topology representation for the road including the first lane and the second lane.

13. A non-transitory medium having processor-executable instructions stored thereon, the medium comprising:

instructions to receive an image of a first lane of a road, the image being captured by a first sensor of a vehicle;

instructions to define the first lane as a set of N ordered points, wherein N is defined based on at least one of a current operating state of the vehicle, a current environment surrounding the vehicle, or any combination thereof;

instructions to represent the first lane, for each of the N ordered points, as an ordered sequence of a plurality of predefined lane components, the plurality of predefined lane components comprising a continuing lane component, a merging lane component, and a splitting lane component, each predefined lane component corresponding to a different structural portion of the first lane such that the ordered sequence of the plurality of predefined lane components in combination define a geometry of the first lane;

instructions to generate images based on the representation of the first lane, where each image represents one of the predefined lane components for one of the N ordered points; and instructions to combine the generated images to generate a topology representation for the first lane.

14. The non-transitory medium of claim 13, wherein each lane of the road is represented by a set of predefined lane line geometries defined by the ordered sequence of the plurality of predefined lane components.

15. The non-transitory medium of claim 14, wherein each lane line geometry in the set of predefined lane line geometries is fully defined by an ordered combination of the predefined lane components, where the set of predefined lane line geometries includes a plurality of lane line geometries defined by a combination of C of the predefined lane components, where C is equal to at least 3 lane components and (N×C) images are generated based on associating one or more of the lane components with one or more of the N ordered points, wherein at least one of the plurality of lane line geometries is a merging lane component followed by a splitting lane component within the ordered sequence.

16. The non-transitory medium of claim 13, wherein the first sensor is a camera onboard the vehicle.

17. The non-transitory medium of claim 13, further comprising:

instructions to receive an image of a second lane of the road, the image of the second lane being captured by the first sensor;

instructions to define the second lane as a set of N ordered points;

instructions to represent the second lane, for each of the N ordered points, as a second ordered sequence of a second plurality of predefined lane components, the second plurality of predefined lane components comprising the continuing lane component, the merging lane component, and the splitting lane component, such that the second ordered sequence of the second plurality of predefined lane components in combination define a geometry of the second lane;

instructions to generate images based on the representation of the second lane, where each image represents one of the predefined lane components for one of the N ordered points for the second lane;

instructions to combine the generated images for the second lane to generate a topology representation for the second lane; and instructions to combine the generated topology representation for the second lane and the generated topology representation for the first lane to generate a complete topology representation for the road including the first lane and the second lane.

* * * * *